United States Patent
Guan et al.

(10) Patent No.: US 9,626,341 B1
(45) Date of Patent: Apr. 18, 2017

(54) METHOD OF AND SYSTEM FOR DISPLAYING MOBILE MESSAGES IN UNSUPPORTED FORMATS

(75) Inventors: Xiaomei Guan, San Jose, CA (US); Huiyue Xu, Beijing (CN)

(73) Assignee: Syniverse Communications, Inc., Tampa, FL (US)

( * ) Notice: Subject to any disclaimer, the term of this patent is extended or adjusted under 35 U.S.C. 154(b) by 1670 days.

(21) Appl. No.: 11/603,367

(22) Filed: Nov. 21, 2006

Related U.S. Application Data (60) Provisional application No. 60/739,141, filed on Nov. 22, 2005, provisional application No. 60/750,941, filed on Dec. 16, 2005.

(51) Int. Cl.
*G06F 17/00* (2006.01)
*G06F 17/22* (2006.01)

(52) U.S. Cl.
CPC ................ *G06F 17/2241* (2013.01)

(58) Field of Classification Search
CPC ................ H04L 51/066; G06F 17/2241
USPC ................................................ 709/206
See application file for complete search history.

(56) References Cited

U.S. PATENT DOCUMENTS

| | | | | |
|---|---|---|---|---|
| 6,308,087 B1 * | 10/2001 | Aoshima | .............. | 340/7.28 |
| 6,333,919 B2 * | 12/2001 | Gaffney | .............. | 370/254 |
| 6,512,448 B1 * | 1/2003 | Rincon et al. | .............. | 340/7.51 |
| 6,934,269 B1 * | 8/2005 | Hasha et al. | .............. | 370/312 |
| 6,947,738 B2 * | 9/2005 | Skog | .............. | H04L 12/587 |
| | | | | 370/328 |
| 7,065,340 B1 | 6/2006 | Einola | | |
| 7,076,340 B1 * | 7/2006 | Inazumi | .............. | H02P 21/04 |
| | | | | 318/700 |
| 8,054,971 B2 * | 11/2011 | Weiner | .............. | H04M 1/72552 |
| | | | | 380/229 |
| 8,429,411 B2 * | 4/2013 | Adams et al. | .............. | 713/176 |
| 2002/0112014 A1 * | 8/2002 | Bennett et al. | .............. | 709/206 |
| 2002/0143523 A1 * | 10/2002 | Balaji et al. | .............. | 704/8 |

(Continued)

OTHER PUBLICATIONS

NJStar Software Corp., NJStar Communicator 2.70, pp. 1-5, relevant pp. 1-5, accessed on Jan. 17, 2007, <http://www.njstar.com/communicator>.

(Continued)

*Primary Examiner* — Laurie Ries
(74) *Attorney, Agent, or Firm* — Andriy Lytvyn; Smith & Hopen, P.A.

(57) ABSTRACT

The present invention is directed to methods of and systems for converting data that is in a format unsupported by a recipient device into images that are supported and can thus be accurately rendered by the recipient device. Thus, recipient devices, such as mobile phones and text messengers, all of which are able to display images, are all able to render characters in languages not supported by the recipient device. A method of the present invention converts data for display on a receiving device configured to accurately render data in one or more supported formats. The method includes determining whether a first format of the data is a supported format, and automatically converting the data into a second format supported by the second device if the first format is not a supported format. Preferably, the first format is defined by a character set and the second format is a binary image format.

36 Claims, 9 Drawing Sheets

(56) References Cited

U.S. PATENT DOCUMENTS

| | | | |
|---|---|---|---|
| 2003/0023671 A1* | 1/2003 | Abdulrahiman et al. | 709/203 |
| 2003/0130894 A1* | 7/2003 | Huettner | G06Q 30/0257 705/14.55 |
| 2003/0172121 A1* | 9/2003 | Evans | H04L 12/5835 709/206 |
| 2004/0005886 A1* | 1/2004 | Oda | H04L 63/10 455/422.1 |
| 2004/0064734 A1* | 4/2004 | Ehrlich | 713/201 |
| 2004/0087300 A1* | 5/2004 | Lewis | 455/412.2 |
| 2004/0092250 A1* | 5/2004 | Valloppillil | H04L 51/38 455/412.1 |
| 2004/0132431 A1* | 7/2004 | Vandermeijden | G06F 17/30887 455/412.2 |
| 2004/0205205 A1* | 10/2004 | Patterson | 709/229 |
| 2004/0266462 A1* | 12/2004 | Chava et al. | 455/466 |
| 2005/0143136 A1* | 6/2005 | Lev | H04L 12/5835 455/566 |
| 2005/0144243 A1* | 6/2005 | Cheng | 709/206 |
| 2006/0053227 A1* | 3/2006 | Ye et al. | 709/230 |
| 2006/0161538 A1* | 7/2006 | Kiilerich | 707/4 |
| 2006/0165040 A1* | 7/2006 | Rathod | G06Q 10/10 370/335 |
| 2006/0251008 A1* | 11/2006 | Wu | H04W 88/08 370/328 |
| 2007/0019580 A1* | 1/2007 | Zhang | H04W 48/18 370/315 |
| 2007/0019623 A1* | 1/2007 | Alt | H04L 63/0281 370/352 |
| 2007/0067398 A1* | 3/2007 | Karmarkar | 709/206 |
| 2007/0117577 A1* | 5/2007 | Harris | H04L 12/5855 455/466 |
| 2007/0183363 A1* | 8/2007 | Liden | H04L 29/12066 370/331 |
| 2009/0221265 A1* | 9/2009 | Liu | H04L 63/0853 455/411 |
| 2011/0041167 A1* | 2/2011 | Nguyen | H04L 63/062 726/6 |
| 2011/0165896 A1* | 7/2011 | Stromberg | G06Q 20/32 455/466 |

OTHER PUBLICATIONS

Openwave Systems Inc., MMS Quick Start, pp. 1-16, relevant pp. 1-16, accessed on Jan. 19, 2007, <http://developer open wave.com/dvl/support/documentation/guides and references/mms quick start/index.htm>.

* cited by examiner

You have a message from Tim at portal@web.com. Your user name is "Tim Smith" and your case-sensitive one-time password is "HurRyUPP".

METHOD OF AND SYSTEM FOR DISPLAYING MOBILE MESSAGES IN UNSUPPORTED FORMATS

RELATED APPLICATION

This patent application claims priority under 35 U.S.C. §119(e) of the U.S. Provisional Patent Application, Ser. No. 60/739,141, filed Nov. 22, 2005, and titled "MOBILE TEXT2IMAGE (T2I) MESSAGING SERVICE," and Ser. No. 60/750,941, filed Dec. 16, 2005, and titled "MOBILE MULTIMEDIA MESSAGING SERVICE VIRTUAL DELIVER (MMS-VD)," both of which are hereby incorporated by reference.

FIELD OF THE INVENTION

The present invention relates to processing mobile messages. More specifically, this invention relates to translating messages so that they can be properly displayed on a receiving device.

BACKGROUND OF THE INVENTION

Messaging systems are popular tools for today's mobile society. Many users exchange text and other messages, which can be composed and read on small text messengers, often found on mobile telephones. Because mobile telephones and other messaging devices are portable, users are able to exchange text and other messages wherever they may be.

Mobile phones and other text messengers have several limitations. For one, these devices can display only a limited number of character sets. As one example, a mobile telephone communicating using Short Message Service ("SMS") is configured to display English-language characters only. That is, the mobile phone has installed on it a platform that supports only English-language characters. Thus, when the mobile phone receives a message in Chinese characters, the message cannot be properly displayed.

Figure 1:
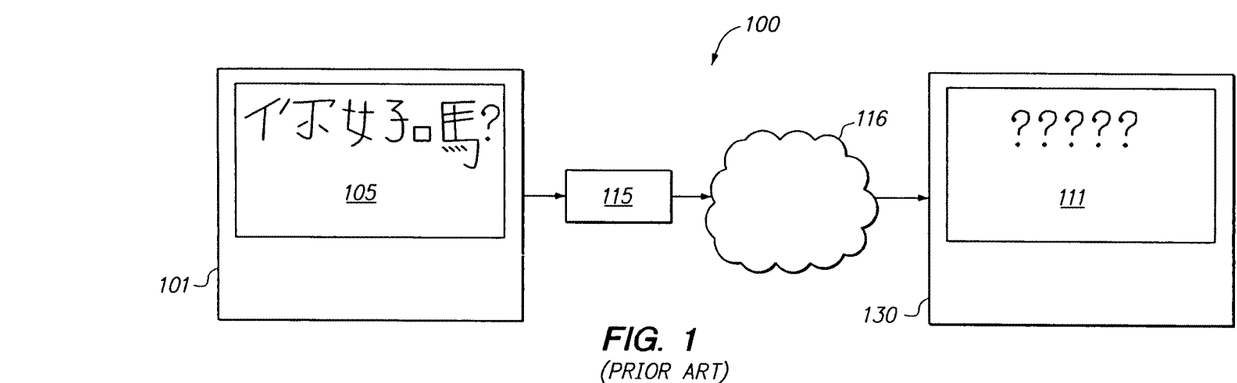
FIG. 1 is a prior art system showing a mobile device sending a text message composed of foreign-language characters and a recipient device unable to accurately render the text message because it does not support the foreign-language characters.

FIG. 1 shows a prior art system 100 that includes a mobile phone 101 coupled to a message sever 115. The message server 115 is coupled over a wide area network 116, such as the Internet, to another mobile phone 130. The mobile phone 101 is used to compose and send a message 105 in Chinese characters. The message server 115 receives the message 105 and transmits it over the wide area network 116 to the mobile phone 130. The mobile phone 130 is not configured to display Chinese characters. Thus, when the mobile phone receives and tries to display the message 105, it instead displays a message 111 of characters that indicate that the message 105 cannot be properly displayed.

One solution is to store on the mobile phone font packages that contain characters and fonts of other languages. In the above example, a font package that contains Chinese character fonts must be installed on or otherwise made available to the mobile phone 130. This solution is expensive, requires additional memory, which may not be available on portable devices, and does not scale well. Moreover, each individual mobile phone must be customized for each user.

SUMMARY OF THE INVENTION

The present invention discloses a method of and a system for accurately rendering characters on a device, even when the device does not support the character set. The present invention is thus advantageous for messages delivered internationally, such as when the message is composed in a foreign language that is unsupported by or incompatible with a recipient's mobile device.

In a first aspect of the present invention, a method is directed to converting data for display on a receiving device configured to accurately render data in one or more supported formats. The method includes determining whether a first format of the data is a supported format and automatically converting the data into a second format supported by the second device if the first format is not a supported format. Preferably, the first format is defined by a character set and the second format is a binary image format such as Device-Independent Bitmap format, Graphics Interchange Format ("GIF"), Portable Document Format ("PDF"), Joint Photographic Experts Group ("JPEG") format, Portable Networks Graphics ("PNG") format, and Tagged Image File Format ("TIFF). Preferably, the character set is an English font, a Chinese font, a Korean font, a Japanese font, a Spanish font, a Cyrillic font, a Baltics font, to name only a few fonts.

The method also includes wirelessly transmitting the message in the first format from the sending device. The receiving device can be any number of devices, mobile or otherwise, including a cell phone, a text messenger, a pager, and a personal digital assistant.

Preferably, the data is converted from the first format to the second format before the message is received on the receiving device.

In one embodiment, the method also includes storing the message in a supported format on a storage node, generating a notification alert containing access information for accessing the message on the storage node, and transmitting the notification alert to the receiving device. The access information includes a user name and a one-time passcode.

The data in the first format is part of a Short Message Service message. Alternatively, the data in the first format is part of a Multimedia Message Service message. In one embodiment, the message in a supported format stored on the storage node is a Multimedia Message Service Message and the notification alert is a Short Message Service message.

In one embodiment, determining whether the first format is a supported format includes comparing an identifier of a sending device with an identifier of the receiving device. The identifiers of the sending and receiving devices can be international area codes, domains, or other identifiers.

In a second aspect of the present invention, a method of processing a multi-part message includes converting a portion of the multi-part message into a format supported for display on a receiving device and combining the converted portion with other portions of the multi-part message to form a converted message for display on the receiving device. The multi-part message includes text, multimedia, binary, and any combination of these. In one embodiment, the multi-part message is an email message, such as a Multipurpose Internet Mail Extension ("MIME") message or a Synchronized Multimedia Integration Language ("SMIL") message.

The method also includes using an identifier of a sending device and an identifier of the receiving device to determine whether to convert the portion of a multi-part message into a format supported for display on the receiving device. In one embodiment, the identifier of the sending device and the identifier of the receiving device are country codes.

In a third aspect of the present invention, a message hub is used to forwarding messages to recipient devices. The message hub includes a conversion unit for converting portions of a message from a first format that cannot be accurately rendered on a recipient device to a second format that can be accurately rendered on the recipient device. Preferably, the conversion unit is a text-to-image converter, and the image format is Device-Independent Bitmap format, GIF, PDF, JPEG, PNG, or TIFF.

In one embodiment, the text-to-image converter includes a comparator for determining whether to convert the portions of the message. The determination is based on a comparison between an identifier of a sending device and an identifier of the recipient device. The identifier of the sending device and the identifier of the recipient devices are country codes or domains. The text-to-image converter also includes one or more character databases. Each character database maps unsupported characters to corresponding images in one or more fonts The message hub also includes one or more of an SMTP/MM4 Gateway, a Short Message Service Gateway, and a Multimedia Message Service Gateway, all for receiving messages. In one embodiment, the message hub also includes a storage unit coupled to the conversion unit and configured to store messages in a supported format. In another embodiment, the message hub also includes a notification and access module coupled to the conversion unit and configured to generate and transmit a notification alert for accessing one or more stored messages.

The hub includes a computer-readable medium containing instructions for executing the functions of the text-to-image converter and the one or more of the SMTP/MM4 Gateway, Short Message Service Gateway, and Multimedia Message Service Gateway. The hub also includes a processor for executing the instructions.

Preferably, the conversion unit and notification and access module are together configured to receive a Short Message Service message containing data in the first format, generate a Multimedia Message Service message containing the data in the second format, store the Multimedia Message Service message on the storage unit, and generate the notification alert as a Short Message Service message. The notification alert includes information for accessing a stored message, such as a user name and a one-time password.

The recipient device is any one of a text messenger, a cell phone, a pager, and a personal digital assistant.

DETAILED DESCRIPTION OF A PREFERRED EMBODIMENT

The present invention is directed to a method of and a system for properly rendering text messages, such as those communicated using Short Message Service ("SMS") or Multimedia Message Service ("MMS"), to name only two services. In accordance with the present invention, text composed on a sending device in a language not supported by a receiving device is accurately rendered on the receiving device. Preferably, the text is converted to a binary image, which can be properly displayed on the receiving device. Advantageously, the receiving device does not have to be reconfigured with a font package that supports the language of the original text message. Text messages can thus be exchanged between international users who exchange messages using different message servers that support different languages. Embodiments of the present invention are thus able to be used by mobile operators and others who support message servers and mobile messaging.

Figure 2:
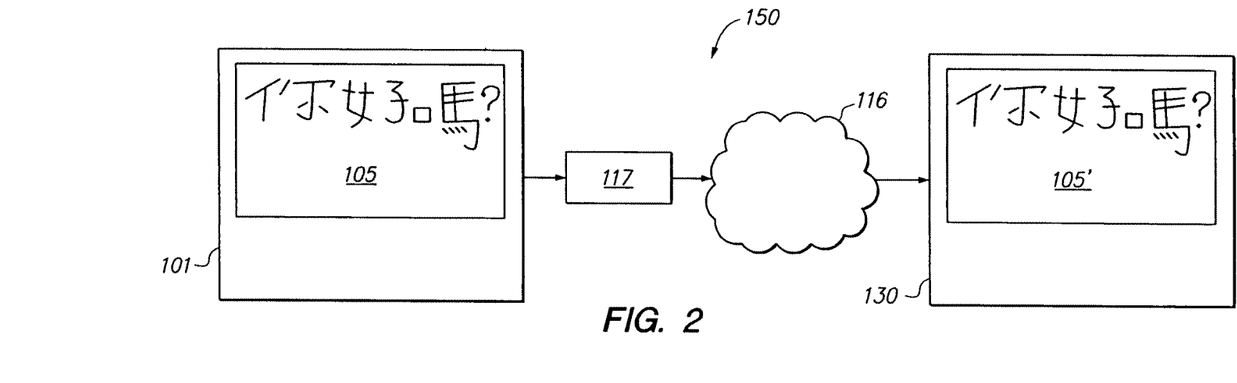
FIG. 2 shows a system in accordance with the present invention in which a mobile device sends the text message in FIG. 1, and the recipient device accurately renders the text message.

FIG. 2 shows a system 150 in accordance with the present invention. In all of the figures that follow, like-numbered elements refer to the same element. The system 150 includes the mobile phone 101 coupled to a message server 117. The message server 117 is coupled to the mobile phone 130 over the wide area network 120. As shown in FIG. 2, the message 105 composed on the mobile phone 101 is accurately rendered on the mobile phone 130, even though the mobile phone 130 is not configured to display Chinese language characters, such as those in the message 105. As explained in more detail below, the message 105 on the mobile phone 101 is displayed as Chinese characters according to a character encoding scheme, such as the Chinese National Standard GB2312 or Big5 encoding, and the message 105' is displayed on the mobile phone 130 as an image, which can be rendered independent of the languages supported by the mobile phone 130.

Figure 3A:
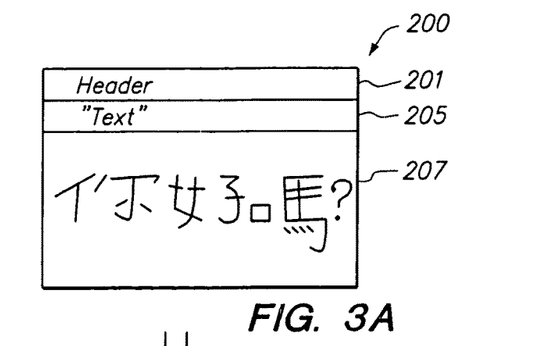
FIGS. 3A and 3B shows the format of the text message generated on the sending device and the format of the corresponding message displayed on the recipient device, both of FIG. 2, in accordance with the present invention.
Figure 3B:
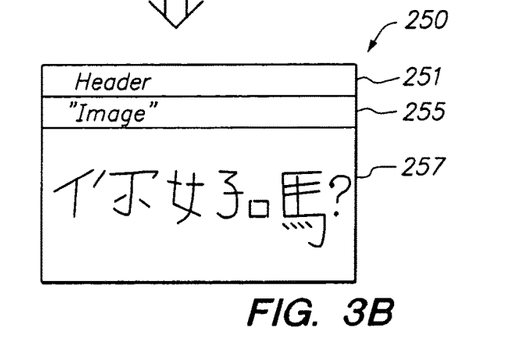

FIGS. 3A and 3B show message blocks 200 and 250 for the messages 105 and 105' in FIG. 2. The message block 200 is the container for the message 105 that is composed on the mobile phone 101. The message block contains a Header block 201 containing header information, a label block 205 containing the identifier "Text," and a data block 207 containing the text message 105. The Header block 201 contains, among other things, a telephone number or other identifier of the mobile phone 101, a telephone number or other identifier of the mobile phone 130, and the length of the text message in the block 207.

The message block 250 is the container for the message 105' that is received from the mobile phone 101 and displayed on the mobile phone 130. The message block 250 also contains a Header block 251, a label block 255, and a data block 257. The label block 255 contains the label "Image," which identifies the data in the data block 257 as image data. The data in the data block 257 will thus be rendered on the mobile phone 130 as an image, and not as a sequence of Chinese characters, characters that the mobile phone 130 is not configured to render accurately. Thus, mobile phones configured to display images are able to display characters in languages not supported by the mobile phones. The image data contained in the data block 257 can be in any number of formats including Device-Independent Bitmap format, Graphics Interchange Format ("GIF"), Portable Document Format ("PDF"), Joint Photographic Experts Group ("JPEG") format, Portable Networks Graphics ("PNG") format, or Tagged Image File Format ("TIFF"), to name only a few formats.

The containers 200 and 250 are shown as similar merely to simplify the discussion. As explained in more detail below, the container 200 can be in one format and the container 250 in another format. As one example, the original message is an SMS message. The container 200 is in the SMS format and the container 250 in the MMS format. Referring to FIG. 2, in this example the message server 117 is an SMS server. As another example, the original message is an MMS message, and the container 200 is in the MMS format. Again referring to FIG. 2, the message server 117 is an MMS server.

Referring to FIG. 2, the text 105 is able to be converted to the image 105' at one or more locations. Preferably, the text 105 is converted to the image 105' at the message server 117. Alternatively, the text 105 is converted to the image 105' on the mobile phone 101, on the mobile phone 130, or at some node between the two.

Figure 4:
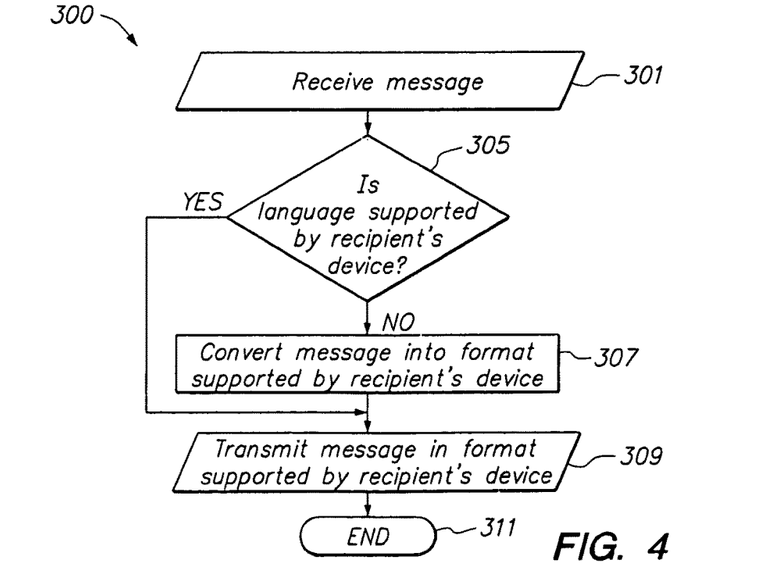
FIG. 4 shows the steps of a process for generating a message in a format that can be displayed on the recipient device of FIG. 2, in accordance with the present invention.

FIG. 4 shows the steps of a process 300 for displaying messages on mobile phones and other devices in accordance with the present invention. In the step 301, a message that has been composed on a first mobile device in a first language and transmitted to a second mobile device is received on a message server. In the step 305, the process determines whether the second device can accurately render the message; that is, whether the second device can "support" the first language. If the second device supports the first language, the process proceeds to the step 309, where the message is transmitted to the second device. If the second device cannot support the first language, the process proceeds to the step 307, where the message is converted into a format supported by the second device. Preferably, the format is a binary image. From the step 307, the process proceeds to the step 309, and then on to the step 311, where the process ends.

As used below, the phrase "supported language" refers to a character set and font that can be accurately rendered on a recipient device, such as a mobile phone or text messenger, to name only a few devices. The phrase "unsupported language" refers to a character set that cannot be accurately rendered on a recipient device. The phrases "sending device" and "originating device" both refer to the device on which the message is composed. The phrase "recipient device" refers to the device to which the message is sent. Thus, preferably, data is identified as supported or unsupported in relation with the recipient device.

The examples used so far show a message that includes only text. Embodiments of the present invention are able to be used with messages that contain multiple parts, such as Multipurpose Internet Mail Extensions ("MIME") messages. A message can be processed using the invention even if it includes any combination of supported text, unsupported text, as well as audio and other executable files that can be played or rendered on the recipient mobile phone without being converted to an image file or other format supported by a recipient device.

Figure 5:
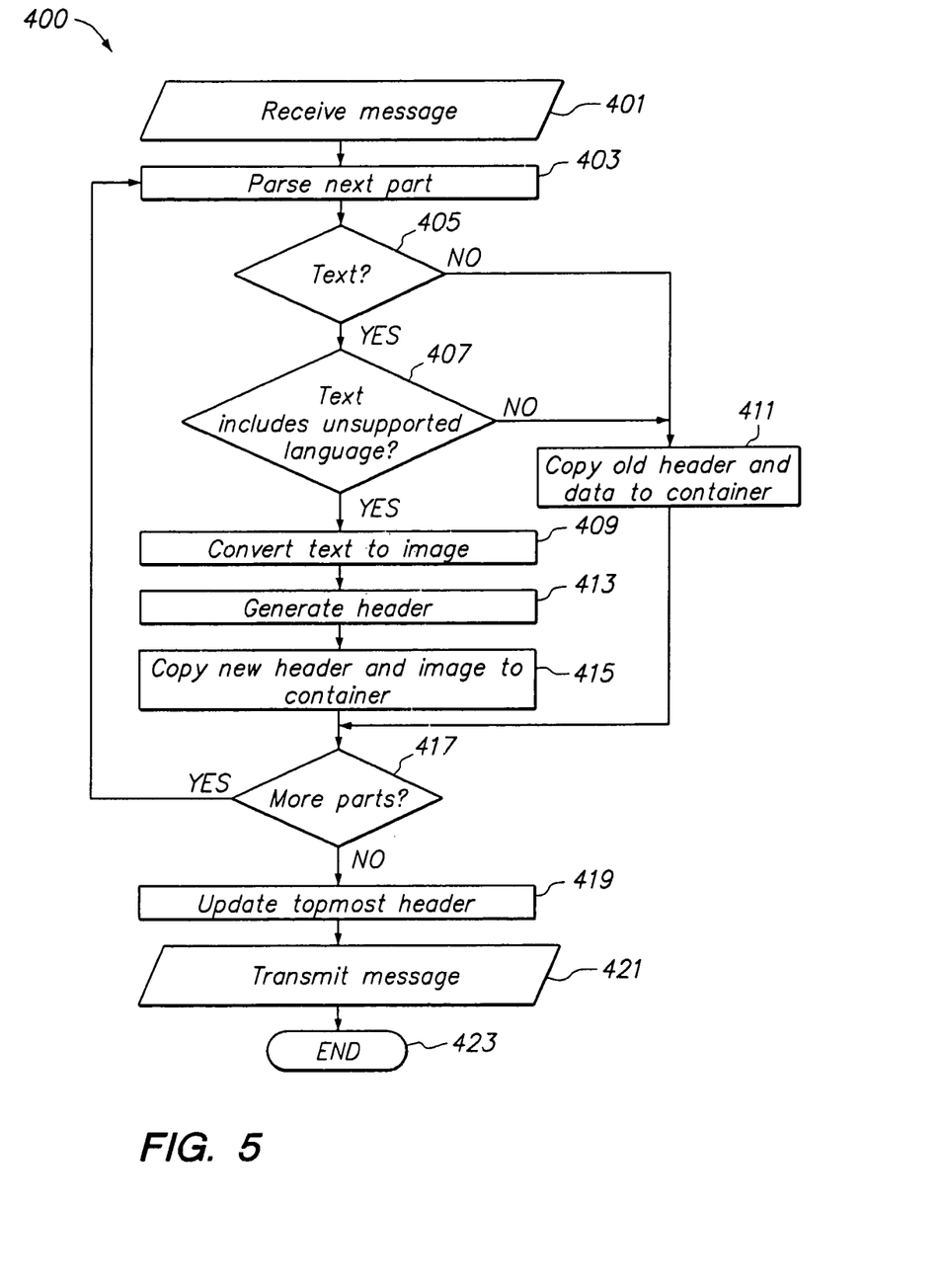
FIG. 5 shows more detailed steps of a process for generating a message in a format that can be displayed on the recipient device of FIG. 2, in accordance with the present invention.

FIG. 5 shows steps of a process 400 for converting a multi-part message in accordance with the present invention. In this embodiment, only those parts that must be converted for display on a recipient device are changed; all other parts are left unchanged. The process works by parsing the message, creating a "destination" container or template for a new message, and copying both converted and unconverted data to the container. The new container, containing any converted images, are then transmitted to the recipient.

Referring to FIG. 5, in the step 401, a multi-part message is received. In the step 403, the next part of the message is parsed and, in the step 405, the process determines whether the part contains text. If the part does not contain text, the process proceeds to the step 411, where the part, including its header, is copied to an output container, and then proceeds on to the step 417. If, in the step 405, the process determines that the part does contain text, the process proceeds to the step 407, where it determines whether the text includes unsupported language. If the process determines that the text includes unsupported language, the process proceeds to the step 409; otherwise, it proceeds to the step 411. In the steps 409, 413, and 415, respectively, the process converts the unsupported language to image data, generates a header that the data is image, and copies the new header and image file to the output container. From the step 415, the process proceeds to the step 417, where it determines whether there are more parts to the message. If there are more parts, the process loops back to the step 403; otherwise, the process proceeds to the step 419, where it updates the topmost header (e.g., field 501' in FIG. 6B), such as by changing the length field if the total length of the message has changed. Next in the step 421, the process transmits the message and, in the step 423, the process ends.

Figure 6A:
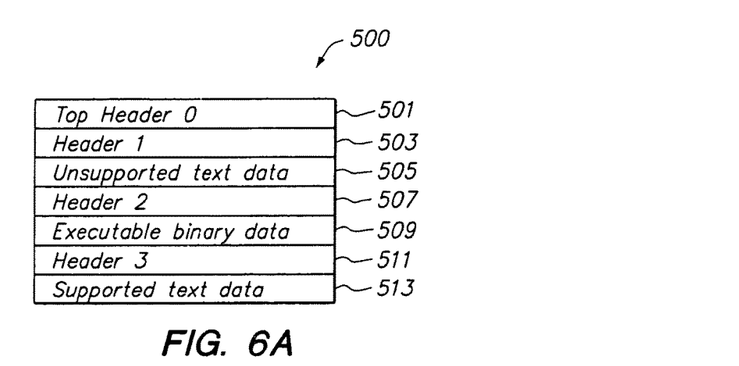
FIG. 6A shows a container for the message on the sending device in FIG. 2.
Figure 6B:
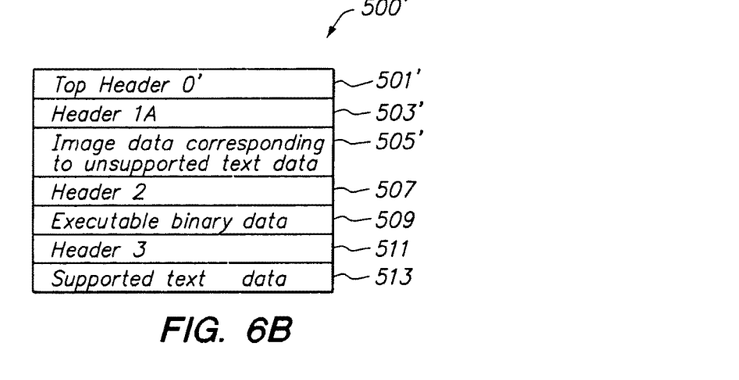
FIG. 6B shows a container for the corresponding message on the recipient device of FIG. 2.

FIG. 6A shows a containers 500 for a message containing both supported and unsupported data, before conversion using the present invention. FIG. 6B shows a container 500' for a message corresponding to the message in the container 500, after the unsupported data has been converted to an image file in accordance with the present invention. The container 500 includes a Top header 501 ("Top Header 0"), a sub header 503 and associated unsupported text data 505, a sub header 507 and associated supported data (an executable binary file) 509, and a sub header 511 and associated supported text data 513. Referring to FIG. 6B, the container 500' is generated from the container 500 so that the unsupported text data is properly rendered on the mobile phone 130 of FIG. 1. The container 500' includes a Top header 501' ("Top header 0'"), a sub header 503' and an associated image file 505' of the unsupported text data 505, the sub header 507 and the associated supported data 509, and the sub header 511 and the associated supported text data 513.

Figure 7A:
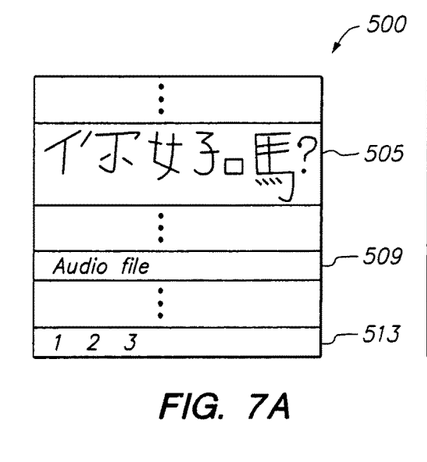
FIGS. 7A and 7B show specific data used for the containers 6A and 6B, respectively.
Figure 7B:
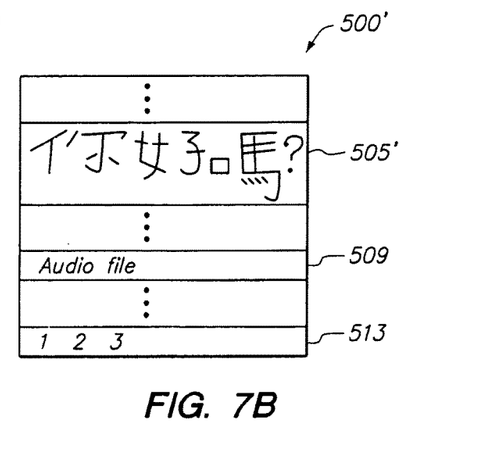

FIG. 7A shows, for example, the container 500 with specific data. The unsupported text data 505 is shown as Chinese characters, the supported executable binary data 509 is shown as an audio file, and the supported text data 513 is shown as Arabic numerals. Similarly, FIG. 7B shows the container 500' with specific data. The Chinese characters 505 in FIG. 7A have been replaced with an image 505' file corresponding to the Chinese characters, the supported executable binary data 509 and the supported text data 513, both shown in the container 500, remain unchanged.

Those skilled in the art will recognize that binary images are able to be stored in a message container in many ways. As one example, an entire binary image of the unsupported text is compressed or otherwise translated into a format suitable for transmission to a recipient mobile telephone.

Figure 8:
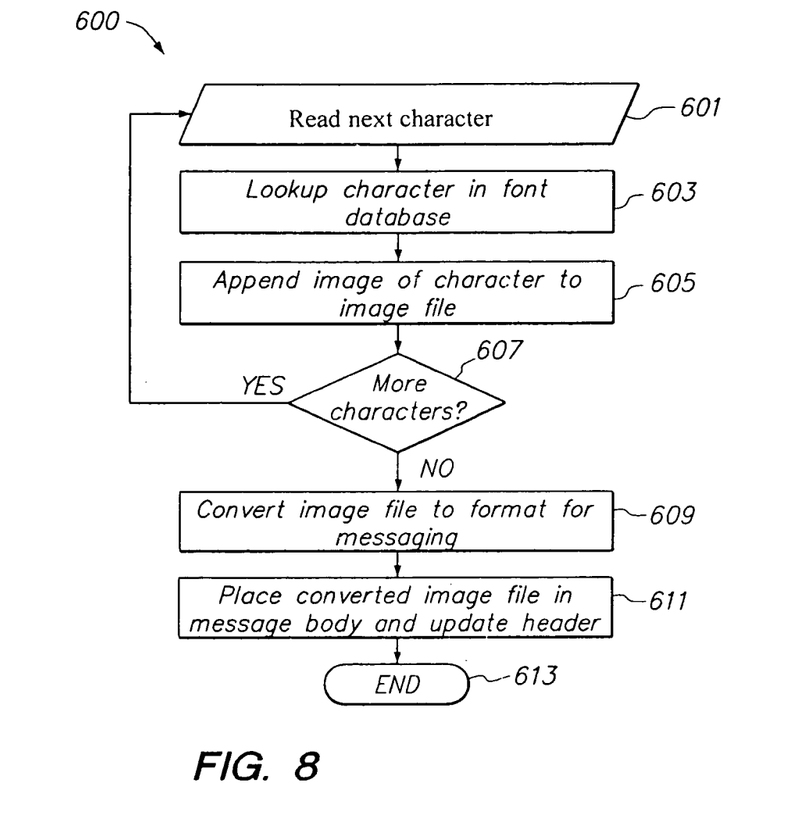
FIG. 8 shows the steps of a process for generating an image file corresponding to unsupported characters, in accordance with the present invention.

Unsupported text can be converted to images in any number of ways. FIG. 8 show the steps of a process for 600 for converting unsupported text or other data to a corresponding image. First, in the step 601, the process reads a character in the sequence of unsupported characters. In the step 603, the process looks up the image of the character in the font database and, in the step 605, appends the image to a final image file. In the step 607, the process determines whether there are any more characters in the message to convert. If there are more characters, the process loops back to the step 601; otherwise, the process proceeds to the step 609. In the step 609, the process converts the final image file in a format suitable for messaging. As explained above, this format can be a file compressed for efficient transmission over a network. Next, in the step 611, the process places the converted image file in the message body and updates the header of the message body to correctly identify the converted image file. The process ends in the step 613.

Figure 9:
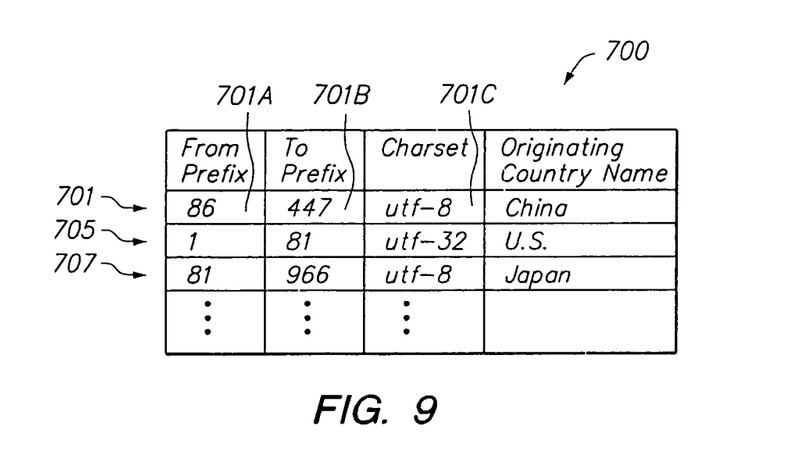
FIG. 9 is a table containing entries that indicate how and for which messages unsupported characters are converted into corresponding image files in accordance with the present invention.

FIG. 9 is a table 700 indicating languages supported by a particular recipient mobile phone in accordance with one embodiment of the present invention. Referring to FIGS. 2 and 7, the table 700 contains information used to determine whether the mobile phone 101 and the mobile phone 130 use message servers identified by country codes for countries that share a common language. For example, if the mobile phone 101 uses a message server identified by country code corresponding to China and the mobile phone 130 uses a message server identified by a country code corresponding to the United States, text in a message composed on the mobile phone 101 is converted to an image file before being displayed on the mobile phone 130. Alternatively, if the mobile phone 101 uses a message server identified by the country code corresponding to England and the mobile phone 130 uses a message server identified by the United States, text in a message composed on the mobile phone 101 is not converted to an image file before being displayed on the mobile phone 130.

The table 700 contains a first column labeled "From Prefix," a second column labeled "To Prefix," a third column labeled "Charset," and a fourth column labeled "Originating Country Name." The table 700 has rows 701, 705, and 707. The exemplary row 701 has an element 701A in the column "From Prefix," with the value "86"; an element 701B in the column "To Prefix," with the value "447"; an element 701C in the column "Charset," with the value "utf-8"; and an element 701D in the column "Originating Country Name," with the value "China." The values of the elements in the row 701 thus indicate that when a message from the international area code "86" (element 701A), the international area code for China, is sent to a mobile phone with the international area code 447 (element 701B), the international area code for mobile phones in Great Britain, if the text is using the utf-8 character set (element 701C), then it will be converted into one or more images using the Chinese TrueType font (element 701D). A message server in accordance with the present invention will thus use the values in table 700 to check the originating device's corresponding area code with the recipient device's corresponding area code, to determine whether to convert any unsupported text data to an image file.

Figure 10:
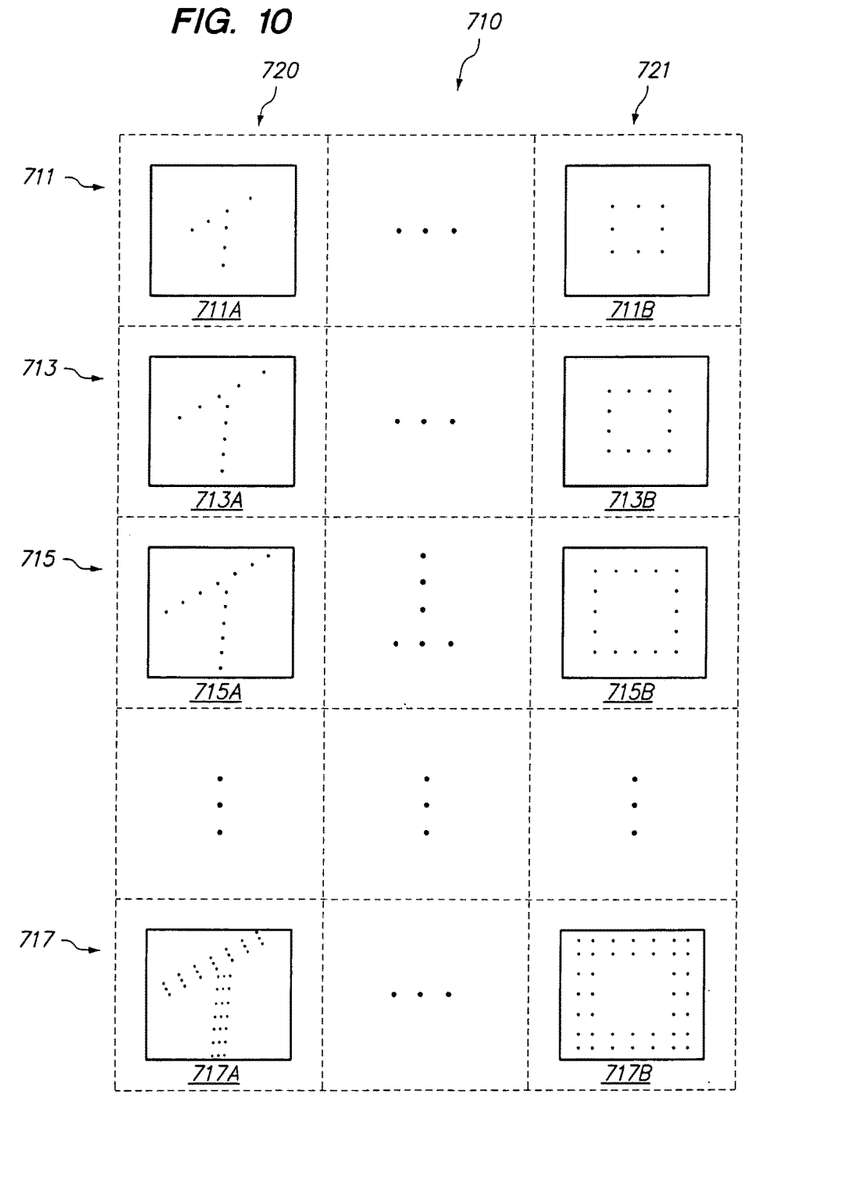
FIG. 10 shows a font database of images of characters in accordance with the present invention.

FIG. 10 is a font database 710 (e.g., a "character-to-image" database) used to convert unsupported characters to corresponding images in accordance with the present invention. The database 710 contains the rows 711, 713, and 715 to 717. The database also contains the columns 720 to 721. In operation, a process in accordance with the present invention uses a text-to-image converter to convert an unsupported character to an image. The process determines the character and font of the converted imaged. Thus, for example, if it is determined that a sequence of unsupported characters in a text message are to be converted to an image in one language and font, a specific database of the language characters and a specific row of the database containing characters of a particular font are used. Referring to FIG. 10, the database contains images of characters for the Chinese language. The first row 711 contains Chinese characters in a first font, the second row 713 contains corresponding characters in a second font, etc. Thus, the process determines the font of the image and uses the corresponding row in the database 710 to generate the unsupported characters in the text or other message. In one embodiment, a character and a font are indices into a character-to-image database.

It will be appreciated that a separate database, such as the database 710, is included for each unsupported language converted in accordance with the present invention. Thus, for example, a system in accordance with the present invention that converts characters in two unsupported languages, will have two corresponding databases, one for each language.

Figure 11A:
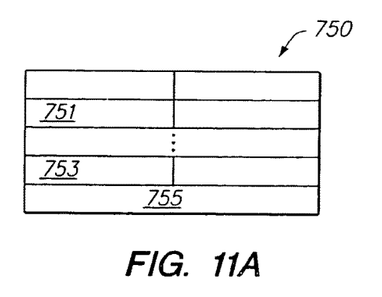
FIGS. 11A and B show elements in data structures used in conjunction with the table shown in FIG. 9.

FIGS. 11A and B show formats for different originating messages, including information used to determine language identifiers for both a sending mobile phone and for a recipient mobile phone. FIG. 11A shows one example of a format for an SMS Submit Protocol Description Unit ("PDU") 750. The SMS Submit PDU 750 contains fields 751, 753, and 755. The field 751 contains the recipient's phone number (including international area code). The field 753 contains the service center number of the sender's SMS center, which will forward the message to the recipient in accordance with embodiments of the present invention. The field 755 contains the original text message. As one example, referring to table 700 and FIG. 10A, if a message using the SMS Submit PDU format were sent from a Chinese originator to a user of a mobile phone in the UK, the international area code contained in the element 751 is "447" and the international area code contained in the element 753 is "86."

It will be appreciated that information other than international area codes are able to be used in accordance with other embodiments of the present invention, information such as Mobile Service Integrated Services Digital Numbers (MSISDNs), Internet Procotol (IP) addresses corresponding to the servers for the sending and recipient mobile phones, and the like.

Figure 11B:
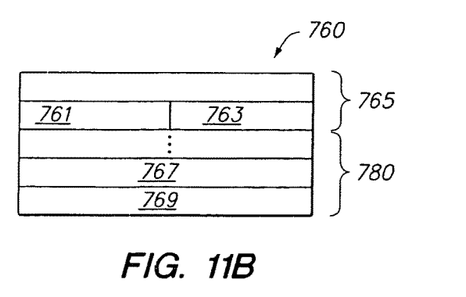

It will also be appreciated that messages are able to be transmitted in accordance with the present invention, using services other than SMS. FIG. 11B, for example, shows a Multimedia Message Service ("MMS") message 760, such as one composed on and transmitted from a mobile phone.

The message 760 includes a header 765 and a body 780. The header 765 includes a "To" field 761 and a "From" field 763. The "To" field 761 contains address information, such as a first domain associated with the recipient's mobile phone number. The "From" field 763 contains address information, such as a second domain associated with the sender's mobile phone number. The body 780 includes, among other things, a content descriptor 767 for the data 769. As one example, the content descriptor 767 indicates that the data 769 is text. The information in the fields 761 and 763 are able to be compared to determine whether the text 769 in the data field 769 is to be converted. For example, the domain in the field 763 indicates that the sending mobile phone corresponds to a domain in China, and the domain in the field 761 indicates that the recipient mobile phone corresponds to a domain in the United States. Accordingly, the text in the field 769 is unsupported, and conversion is performed in accordance with the present invention.

Figure 12:
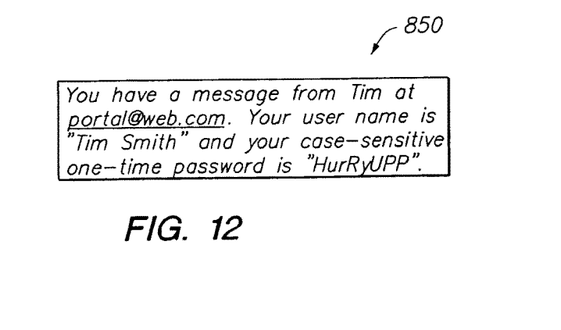
FIG. 12 is an SMS message for retrieving an MMS message that contains an image corresponding to unsupported characters, in accordance with the present invention.

In accordance with the present invention, a user on a sending device is able to send messages using SMS, MMS, email, and other types of messages. In one embodiment, an SMS message containing unsupported characters is converted to a corresponding MMS message that contains an image of the unsupported characters. The MMS message is stored on a message server and an SMS message containing a information for retrieving the MMS message is sent to the intended recipient device. Thus, if the recipient is busy or her device is turned off, she can retrieve the MMS message at a later time. In one embodiment, the SMS contains a URL of the message server, a user name, and a one-time password for retrieving the MMS message. FIG. 12 shows an SMS message 850 containing information for retrieving an MMS message. The SMS 850 contains a URL ("portal@web.com"), a user name "TimSmith", and a one-time password "HuRyUPP." In other embodiments, a token is stored on the recipient's mobile phone so that when a URL is accessed, the recipient is automatically logged on to access the MMS message.

Figure 13:
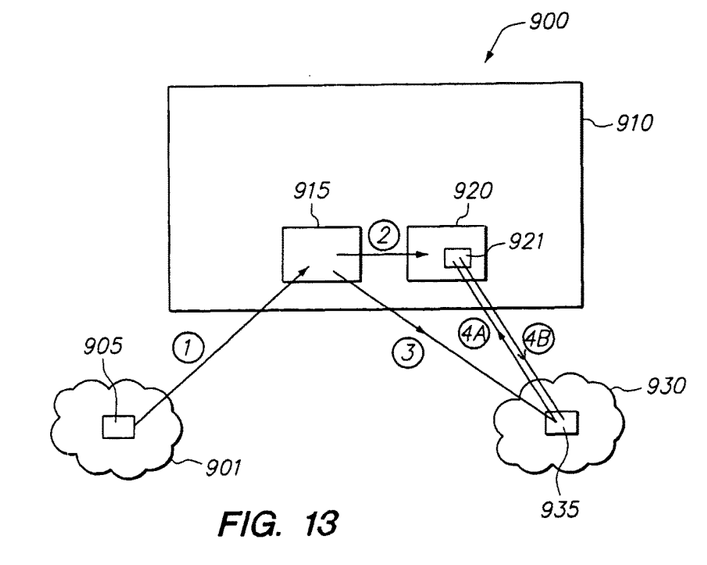
FIG. 13 is a block diagram for illustrating the components of a system and a sequence of steps for storing and accessing an MMS message in accordance with the present invention.

FIG. 13 is a block diagram of a system 900 for accessing a stored MMS message in accordance with the present invention. A sender using a device 905 on a Public Land Mobile Network ("PLMN") 901 composes an original message intended for a recipient on a device 935 on a PLMN 930. The device 905 transmits the original message to a conversion unit 915 on a message server 910 as shown by the line labeled 1. The conversion unit 915 converts any unsupported text in the message to generate a new MMS message in accordance with the present invention and stores it at a location 921 on a storage unit 920, as shown by the line labeled 2. The conversion unit 915 then generates and sends to the device 935 access information, as shown by the line labeled 3. A user on the device 935 is able to use the access information to log on to the storage unit as shown by the line labeled 4A, using, for example, a Web portal, and then retrieve the new MMS message, as shown by the line labeled 4B.

Referring to FIG. 13, those skilled in the art will recognize that the device 905 can be many different types of devices. For example, the device 905 can be a mobile phone communicating with the message server 910 over MMS Centers (MMSCs), SMS Centers (SMSCs), or email severs, using a variety of interfaces and protocols including, but not limited to, MM4, HyperText Transfer Protocol (HTTP), Simple Mail Transfer Protocol (SMTP), to name only a few interfaces and protocols. Similarly, the device 935 can be a mobile phone communicating with the message server 910 over MMSCs, SMSCs, or email severs.

Figure 14:
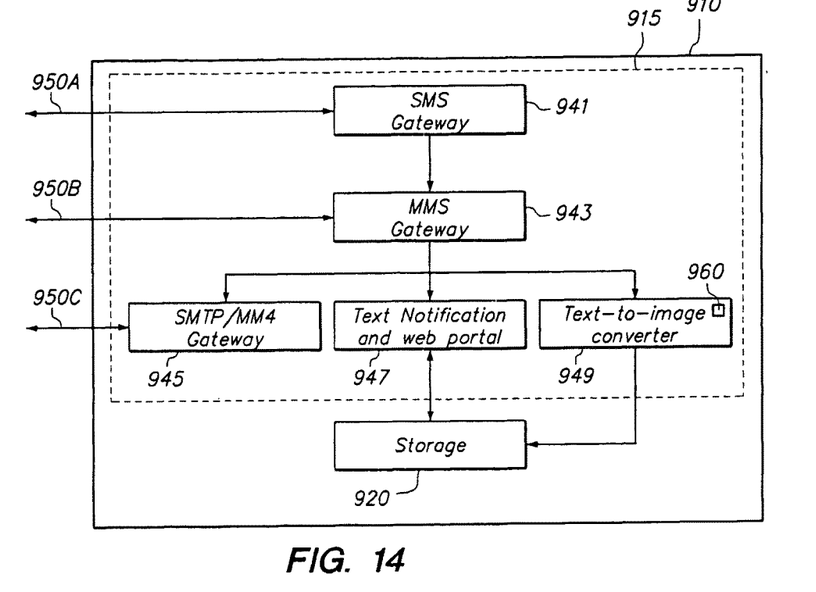
FIG. 14 is a more detailed block diagram of the components of the message server shown in FIG. 13.

FIG. 14 is a block diagram of the message server 910 of FIG. 13 in more detail. The message server 910 includes an SMS Gateway 941 coupled over channels 950A to one or more SMSCs (not shown), an MMS Gateway 943 coupled over channels 950B to one or more MMSCs (not shown), and an SMTP/MM4 Gateway 945 coupled over channels 950C to one or more email servers (not shown). The MMS Gateway 943 is coupled to the SMTP/MM4 Gateway 915, a Text Notification and Web Portal 947, and a Text-to-Image Converter 949. The Text-to-Image converter 949 contains one or more character databases 960. Each of the character databases 960 maps unsupported characters to corresponding images in one or more fonts. The Text Notification and Web Portal 947 and the Text-to-Image Converter 949 are both coupled to the Storage Unit 920.

In operation, messages from SMSCs are routed from the SMS Gateway 941, to the MMS Gateway 943 where a corresponding MMS message is formed using the Text-to-Image Converter 949. The corresponding MMS message is stored in the Storage unit 920 and access information is generated and sent in an SMS message to a user using the Text Notification and Web Portal 947. The user then uses the access information to retrieve the corresponding MMS message through the Text Notification and Web Portal 947.

When a sender composes and transmits an MMS message, the message is transmitted through the MMS Gateway 943 in a similar manner. And when a sender transmits a regular email message, the message is similarly transmitted through the SMTP/MM4 Gateway 945.

Figure 15:
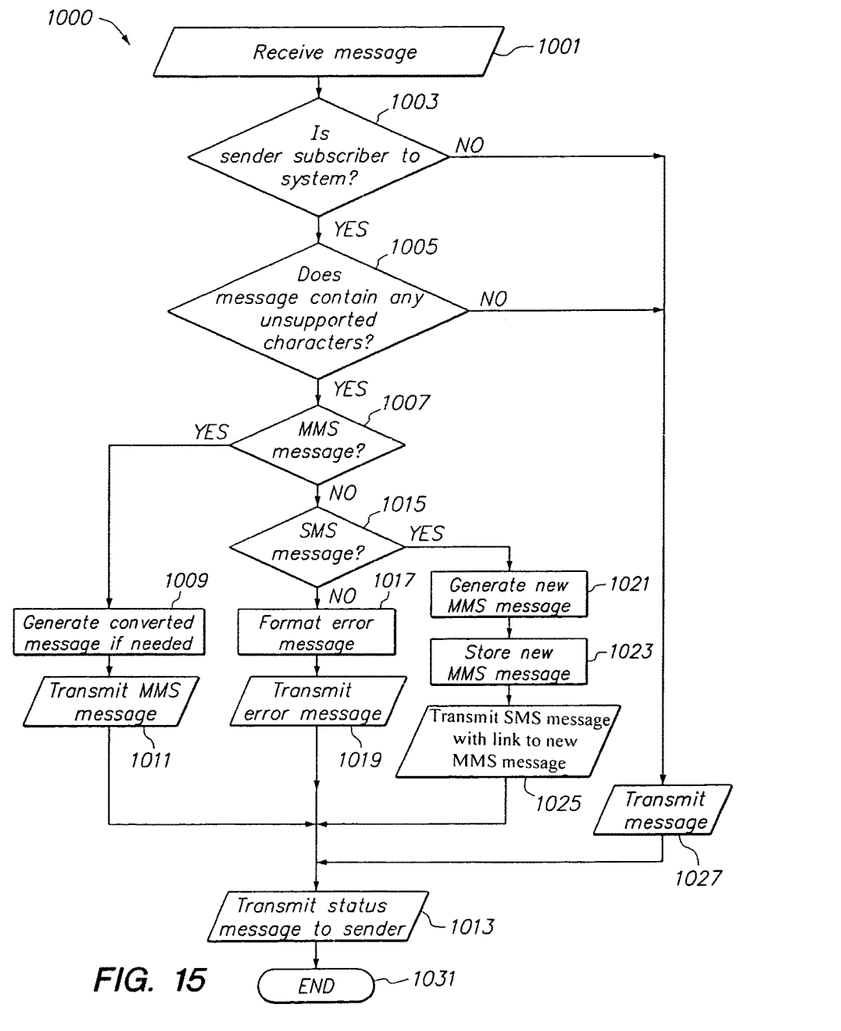
FIG. 15 shows the steps of a process for receiving and converting messages from different sending devices, in accordance with the present invention.

As explained above, the present invention is able to be used to convert characters in an unsupported language when the characters are included as part of an SMS message, an MMS message, a SMIL message, a regular email message, and many other types of message. FIG. 15 shows the steps of a process 1000 for converting unsupported characters in different types of messages in accordance with the present invention. To simplify the discussion that follows, the process 1000 is configured to support the conversion of unsupported characters contained only in MMS and SMS messages. It will be appreciated that unsupported characters in other types of messages are able to be converted in accordance with the present invention.

First, in the step 1001, a message composed on a first mobile phone is transmitted to and received on a message server in accordance with the present invention. In the step 1003, the process determines whether the sender is a subscriber to the conversion system of the present invention. If the sender is not a subscriber, the process proceeds to the step 1027, where the message is transmitted to the recipient, unconverted. If the sender is a subscriber, the process proceeds to the step 1005. In the step 1005, the process determines whether the message contains any unsupported characters. If it does, the process proceeds to the step 1007; otherwise, the process proceeds to the step 1027.

In the step 1007, the process determines whether the message is an MMS message. If the message is an MMS message, the process proceeds to the step 1009. In the step 1009, a converted MMS message is generated and copies to an output container if the MMS message contains unsupported characters, or the original message is copied to the output container if the MSS message does not contain unsupported characters. The process proceeds to the step 1011, where the output container is transmitted to the intended recipient, and proceeds to the optional step 1013, in which a status of the transmission (e.g., "successful," "message converted," "error," etc.) is sent to the sender. The process then ends in the step 1031.

If, in the step 1007, it is determined that the message is not an MMS message, the process proceeds to the step 1015, in which the process determines whether the message is an SMS message. If the message is an SMS message, the process proceeds to the step 1021, in which a new MMS message is generated to include any unsupported data in an image file. From the step 1023, the process proceeds to the step 1023, in which the new MMS message is stored on a message server, and proceeds to the step 1025, in which an SMS message containing access information to the new MMS message is transmitted to the recipient device. From the step 1025, the process proceeds to the step 1013.

If, in the step 1015, it is determined that the message is not an SMS message, the process proceeds to the step 1017, in which an error status message is generated, indicating that the system is not configured to convert the type of message sent by the sender. The process proceeds to the step 1019, in which the error message is transmitted to the sender, and then on to the step 1013.

Embodiments of the present invention are able to convert text or characters in any language to images that can be accurately rendered by any device capable of rendering images. Thus, embodiments of the present invention are able to render characters in Spanish, Nordics, Korean, Greek, Simplified Chinese, Traditional Chinese, Portuguese, Hindi, Turkish, Japanese, Arabic, Hebrew, Thai, Baltics, Russian, Celtics, Cyrillics and French, to name only a few languages.

Embodiments of the present invention can also be sued to generate detailed reports of messages that have been converted and can charge customers accordingly.

It will also be appreciated that devices other than mobile phones are able to be used to composed, transmit, and receive messages in accordance with the invention. Other devices include, but are not limited to, text messengers, pagers, and personal digital assistants.

It will be readily apparent to one skilled in the art that other modifications may be made to the embodiments without departing from the spirit and scope of the invention as defined by the appended claims.

We claim:

1. A method of converting data in a first format in a message transmitted from a sending device for display on a receiving device configured to accurately render data in one or more supported formats comprising:
   determining the first format of the data in the message transmitted from the sending device, wherein the first format is defined by a character set, the message being a Short Message Service (SMS) or a Multimedia Messaging Service (MMS) message;
   determining whether the receiving device supports the first format by comparing a first domain associated with a mobile phone number of the sending device with a second domain associated with a mobile phone number of the receiving device; and
   responsive to determining that the receiving device does not support the first format based on comparison of the first domain and the second domain, converting the data into a second format supported by the receiving device.

2. The method of claim 1, wherein the second format is a binary image format.

3. The method of claim 2, wherein the character set is one of an English font, a Chinese font, a Korean font, a Japanese font, a Spanish font, a Cyrillic font, and a Baltics font.

4. The method of claim 1, wherein the second format is one of Device-Independent Bitmap format, Graphics Interchange Format, Portable Document Format, Joint Photographic Experts Group format, Portable Networks Graphics format, and Tagged Image File Format.

5. The method of claim 1, further comprising wirelessly transmitting the message in the first format from the sending device.

6. The method of claim 1, wherein the receiving device is any one of a cell phone, a text messenger, a pager, and a personal digital assistant.

7. The method of claim 1, wherein the data is converted from the first format to the second format before the message is received on the receiving device.

8. The method of claim 1, further comprising:
   storing the message in a supported format of the receiving device on a storage node for retrieval by the receiving device;
   generating a notification alert containing access information for accessing the message on the storage node; and
   transmitting the notification alert to the receiving device.

9. The method of claim 8, wherein the access information comprises a user name and a one-time passcode.

10. The method of claim 8, wherein the message in a supported format stored on the storage node is a Multimedia Message Service Message and the notification alert is a Short Message Service message.

11. The method of claim 1 wherein determining the first format of the data comprises analyzing the data to determine one of an area code, a domain name, and a country code, each associated with the sending device.

12. The method of claim 1 wherein the determining whether the first format of the data is the supported format of the receiving device comprises analyzing the data to determine one of an area code, a domain name, and a country code, each associated with the receiving device.

13. The method of claim 1 wherein the supported format is a data format which can be accurately rendered for display on the receiving device.

14. The method of claim 1 wherein a user of the sending device is subscribed to a service implementing the method.

15. The method of claim 1, wherein converting the data into a second format is further based on a type of the character set.

16. A method of processing a multi-part user-composed message having text data including a first part and a second part for transmission from a sending device to a receiving device comprising:
   separately determining a first format of the text data in the first part and the second part, wherein the first and the second parts are able to be determined as having different first formats, the first format being defined by a character set, the message being a Short Message Service (SMS) or a Multimedia Messaging Service (MIMS) message;
   determining whether the receiving device supports the first format of the first part and the second part of the message by comparing a first domain associated with a mobile phone number of the sending device with a second domain associated with a mobile phone number of the receiving device;
   responsive to determining that the receiving device does not support the first format of the first part of the text data, converting the first part into a second format supported for display on the receiving device; and
   combining the converted first part with the second part of the text data to form a converted message for display on the receiving device.

17. The method of claim 16, wherein the multi-part message comprises text, multimedia, binary, and any combination of these.

18. The method of claim 16, wherein the multi-part message is an email message.

19. The method of claim 18, wherein the email message is a Multipurpose Internet Mail Extension message.

20. The method of claim 18, wherein the email message is a Synchronized Multimedia Integration Language message.

21. The method of claim 16, wherein the identifier of the sending device and the identifier of the receiving device are international area codes.

22. The method of claim 16, wherein the identifier of the sending device and the identifier of the receiving device are domains.

23. The method of claim 16, wherein the converting the data is based only on an international area code associated with the sending device, an international area code associated with the receiving device, the character set, and a font of the second format.

24. A message hub for forwarding Short Message Service (SMS) or Multimedia Messaging Service (MMS) messages from a sending device to a recipient device, the message hub comprising a non-transitory computer-readable medium programmed with instructions for converting portions of a message from a first format defined by a character set that cannot be accurately rendered on a recipient device to a second format defined by an image that can be accurately rendered on the recipient device, wherein determination of whether the recipient device supports the first format is based on comparison of a first domain associated with a mobile phone number of a sending device and a second domain associated with a mobile phone number of a recipient device.

25. The message hub of claim 24, further comprising a text-to-image converter.

26. The message hub of claim 25, wherein the text-to-image converter is configured to generate an image in Device-Independent Bitmap format, Graphics Interchange Format, Portable Document Format, Joint Photographic Experts Group format, Portable Networks Graphics format, or Tagged Image File Format.

27. The message hub of claim 25, wherein the text-to-image converter comprises a comparator for determining whether to convert the portions of the message based on a comparison between an identifier of the sending device and an identifier of the recipient device.

28. The message hub of claim 27, wherein the text-to-image converter further comprises one or more character databases, wherein each character database maps characters that cannot be accurately rendered on the recipient device to corresponding images in one or more fonts.

29. The message hub of claim 24, further comprising one or more of an SMTP/MM4 Gateway, a Short Message Service Gateway, and a Multimedia Message Service Gateway, all for receiving messages.

30. The message hub of claim 29, further comprising a storage unit coupled to the conversion unit and configured to store messages in a format supported by the recipient device.

31. The message hub of claim 29, further comprising a conversion unit and a notification and access module coupled to the conversion unit and configured to generate and transmit a notification alert for accessing one or more stored messages.

32. The message hub of claim 31, wherein the conversion unit and notification and access module are together configured to receive a Short Message Service message containing data in the first format, generate a Multimedia Message Service message containing the data in the second format, store the Multimedia Message Service message on the storage unit, and generate the notification alert as a Short Message Service message.

33. The message hub of claim 31, wherein the notification alert comprises information for accessing a stored message.

34. The message hub of claim 33, wherein the information comprises a user name and a one-time password.

35. The message hub of claim 24, wherein the recipient device is any one of a text messenger, a cell phone, a pager, and a personal digital assistant.

36. The message hub of claim 24, wherein the converting comprises mapping characters in the first format and a font of the characters into the image.

* * * * *